Sept. 23, 1924.    E. J. SWEENEY    1,509,450
AUTOMOBILE SCREEN
Filed July 13, 1920    2 Sheets-Sheet 1
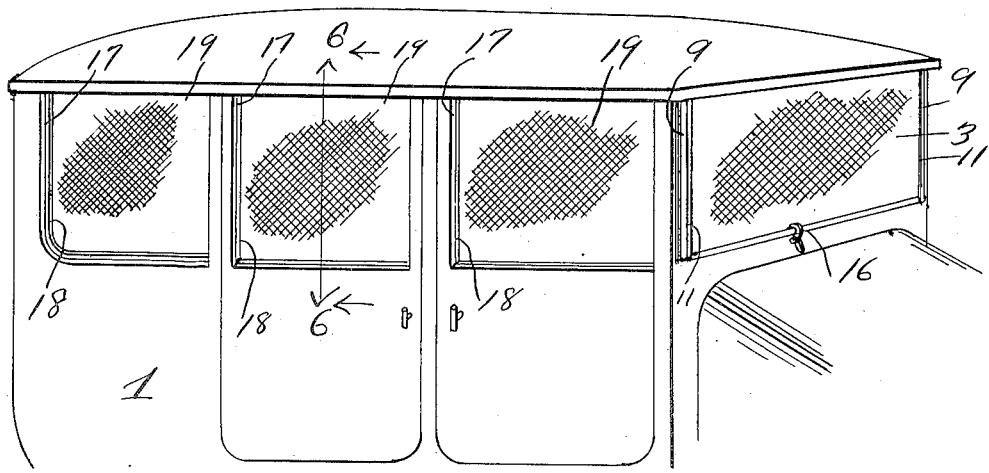
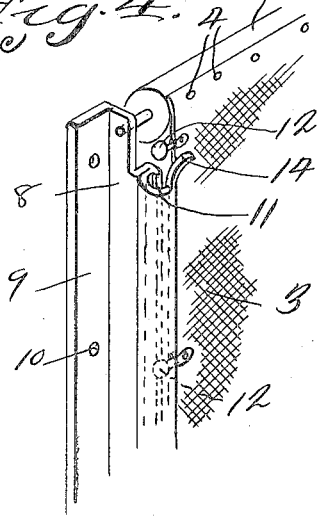
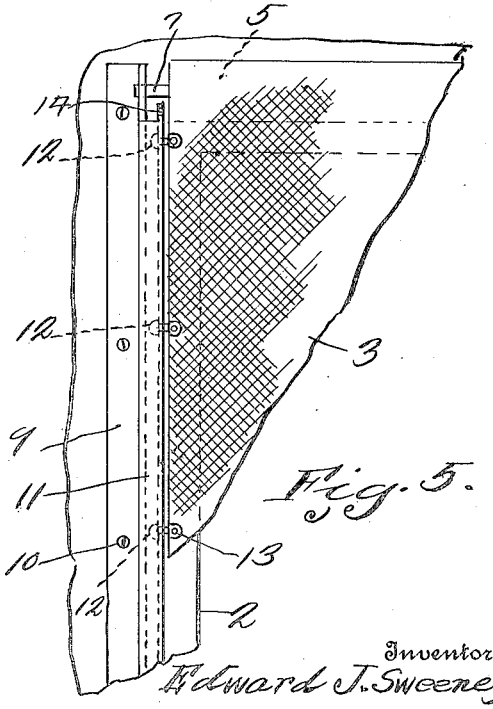
Inventor
Edward J. Sweeney Sept. 23, 1924.  
E. J. SWEENEY  
AUTOMOBILE SCREEN  
Filed July 13, 1920
1,509,450
2 Sheets-Sheet 2
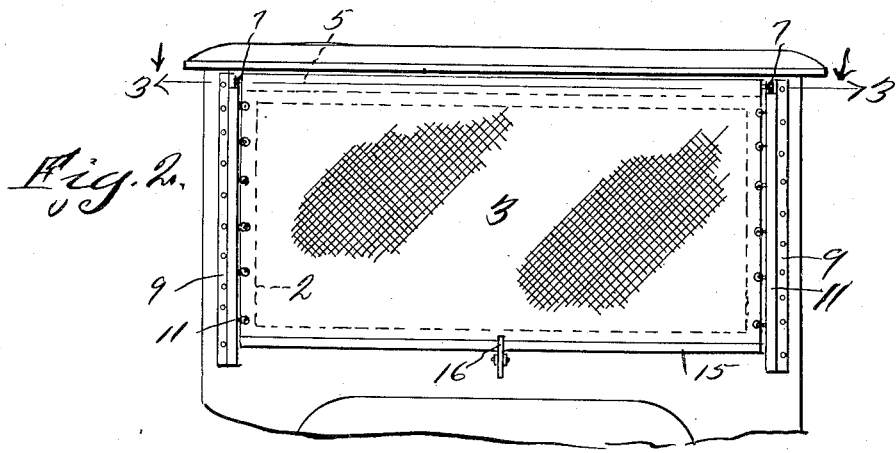
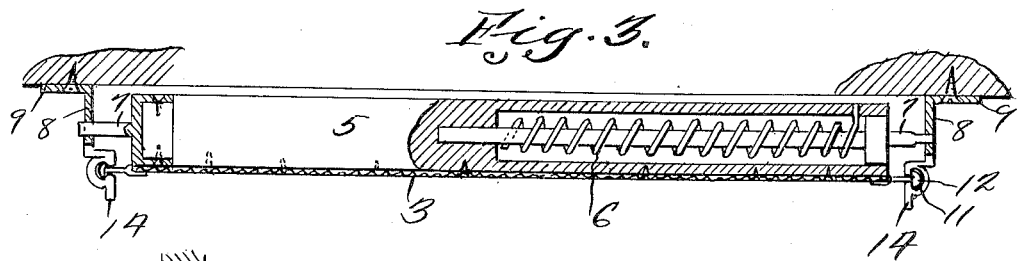
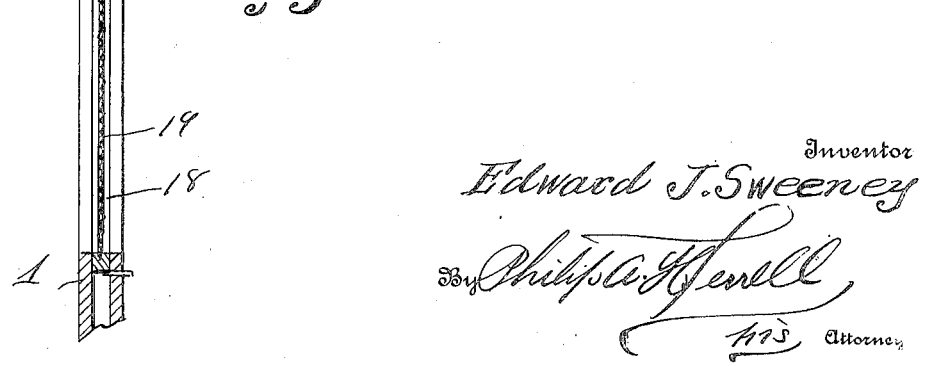
Inventor  
Edward J. Sweeney Patented Sept. 23, 1924.

1,509,450

UNITED STATES PATENT OFFICE.

EDWARD J. SWEENEY, OF COUNCIL BLUFFS, IOWA.

AUTOMOBILE SCREEN.

Application filed July 13, 1920. Serial No. 395,877.

*To all whom it may concern:*

Be it known that EDWARD J. SWEENEY, a citizen of the United States, residing at Council Bluffs, in the county of Pottawattamie and State of Iowa, has invented certain new and useful Improvements in Automobile Screens, of which the following is a specification, reference being had therein to the accompanying drawing.

The invention relates to automobile screens and has for its object to provide screening means for the window openings and windshield opening of automobiles, preferably of the sedan type, thereby preventing bugs from flying into the faces of occupants of the machine while driving at night, said bugs being attracted by the headlights. Also to prevent branches of trees and bushes from coming into contact with the faces of the occupants of the car.

A further object is to provide a roller carried screen for the front opening of the automobile so that the same may be rolled upwardly or downwardly as desired.

A further object is to provide supporting and guiding means for the screen roller comprising angled members secured to the automobile body adjacent each side of the front opening thereof, the outwardly extending flanges of the angled members being bent so as to form vertically disposed channels through which channels headed members carried by the edges of the wire screening slide, said headed members preventing bulging of the screen under wind pressure. Also to provide a guiding member for guiding the headed lugs into each of the vertically disposed guide channels.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of a portion of an automobile body of the sedan type showing the screened openings.

Figure 2 is a front elevation of a portion of the automobile body showing the roller carried screen in lower position.

Figure 3 is a horizontal sectional view taken on line 3—3 of Figure 2, showing the spring actuated roller.

Figure 4 is a perspective view on an enlarged scale of a portion of one of the roller supporting angles and roller.

Figure 5 is an enlarged detail view, showing in front elevation a portion of a roller, the screen and the supporting and guiding angle.

Figure 6 is a sectional view taken on line 6—6 of Figure 1, showing one of the slidable window closures.

Referring to the drawings, the numeral 1 designates a sedan body of an automobile and 2 the front opening thereon. It has been found while driving at night, that unless the opening 2 is closed that bugs which are attracted by the light will pass through opening 2 and strike the operator in the face, this often causes loss of control of the automobile by the operator and consequent damage. To overcome this difficulty the opening 2 is provided with a roller carried screen 3 formed from wire mesh. The screen 3 is secured as at 4 to a conventional form of spring actuated roller 5, which roller normally maintains the screen 3 rolled on its periphery by means of a coiled spring 6. The pintles 7 of the roller 5 are mounted in apertures of the flanges 8 of angle members 9, which are secured to the facing of the body member 1 adjacent the vertical sides of the opening 2 by means of grooves 10. The angles 9 have their flanges 8 bent so as to form vertically disposed channels 11, into which channels the headed lugs 12, which are secured to the vertical edges of the screen 3 as at 13 are guided by the outwardly bent integral lugs 14. Headed lugs 12 extend beyond the ends of the roller 4, therefore do not prevent the screening from rolling on the roller. The lower edge of the screen 3 is provided with a metallic strip 15, so that the operator may grasp the same for pulling the screen downwardly until the metallic strip 15 is engaged by the hook 16, which hook holds the screen in its down position against the action of the coiled spring 6. When it is desired to raise the screen, hook 16 is unhooked and the screen is allowed to wind upon the roller 5 under the influence of the coiled spring 6.

Referring to Figure 6, it will be seen that the window openings 17 are closed by vertically slidable frames 18, which are provided with screening 19. The screening 19 being substituted in place of glass frames of this character, said frames operate substantially the same as ordinary window frames now in use in automobile bodies.

From the above it will be seen that a roller carried screen is provided for closing the front opening of an automobile which screen is so guided in its downward movement that it will not bulge centrally while in its downward movement or bulge when entirely down. It will also be seen that the guiding and bulge preventing means is so constructed that it will not interfere with the rolling of the screen on the screen roller.

The invention having been set forth what is claimed as new and useful is:—

The combination with an automobile window opening, of a screen therefor, said screen comprising a horizontally disposed roller adjacent the upper side of the window opening, a wire mesh screen carried by said roller and unrolled from the forward side thereof, the lower end of the wire mesh screen being provided with a horizontally disposed stiffening rod, latching means carried adjacent the lower end of the window opening for engaging and holding the reinforcing rod, channel guides adjacent the opposite sides of the window opening, said guides comprising angularly shaped bars secured to a support adjacent the inner side of the roller, an outwardly extending flange carried by said bars, said roller having bearings in said outwardly extending flanges, the outer ends of said outwardly extending flanges being bent upon themselves to form channels in vertical alignment with the outer side of the roller, the upper outer side of said channels being provided with upwardly and outwardly extending integral guide lugs, and relatively close headed members carried by the sides of the wire mesh screen and having their heads disposed in the channeled members, said wire mesh screen being held against bulging inwardly incident to air pressure as the vehicle moves forwardly and the wire mesh allowing the passage of air through the screen and excluding foreign matter.

In testimony whereof I hereunto affix my signature.

EDWARD J. SWEENEY.